United States Patent

Pantone et al.

Patent Number: 5,646,230
Date of Patent: Jul. 8, 1997

[54] ISOCYANATE-TERMINATED PREPOLYMERS, A PROCESS OF PRODUCING POLYURETHANE/POLYUREA ELASTOMERS THEREFROM, AND THE RESULTANT ELASTOMERS

[75] Inventors: Richard S. Pantone, New Martinsville; James W. Rosthauser, Glendale; Karl W. Haider, New Martinsville, all of W. Va.

[73] Assignee: Bayer Corporation, Pittsburgh, Pa.

[21] Appl. No.: 575,979

[22] Filed: Dec. 21, 1995

[51] Int. Cl.⁶ .................................... C08G 18/75
[52] U.S. Cl. .................... 528/64; 528/67; 252/182.2; 252/182.22
[58] Field of Search .................. 528/67, 64; 252/182.2, 252/182.22

[56] References Cited

U.S. PATENT DOCUMENTS

| | | | |
|---|---|---|---|
| 3,115,481 | 12/1963 | Pigott et al. | 260/77.5 |
| 3,211,701 | 10/1965 | Müller et al. | 260/75 |
| 3,600,358 | 8/1971 | Taub | 260/75 NH |
| 3,766,148 | 10/1973 | Taub | 260/77.5 AM |
| 3,789,032 | 1/1974 | Hoeschele | 260/75 NT |
| 3,963,681 | 6/1976 | Kaneko et al. | 260/77.5 AM |
| 3,997,514 | 12/1976 | Kogon | 260/77.5 AM |
| 4,098,773 | 7/1978 | Illers et al. | 528/65 |

*Primary Examiner*—Rachel Gorr
*Attorney, Agent, or Firm*—Joseph C. Gil; N. Denise Brown

[57] ABSTRACT

This invention relates to isocyanate-terminated prepolymers, a process for the preparation of these isocyanate-terminated prepolymers, a process for the production of polyurethane\polyurea elastomers prepared from a diisocyanate comprising these prepolymers, and the elastomers produced by this process. These isocyanate-terminated prepolymers have a viscosity less than about 6000 mPa·s at 80° C. and an NCO content of about 3 to 10%. These isocyanate-terminated prepolymers are the reaction product of a) an aromatic diisocyanate,
b) a polyether polyol having an OH number of about 25 to 125 and containing from about 1.8 to 2.5 hydroxyl groups, and
c) an aliphatic diisocyanate.

The equivalent ratio of the polyether polyol to the aromatic diisocyanate is from about 1.0:0.7 to 1.0:1.1.

13 Claims, No Drawings

ISOCYANATE-TERMINATED PREPOLYMERS, A PROCESS OF PRODUCING POLYURETHANE/POLYUREA ELASTOMERS THEREFROM, AND THE RESULTANT ELASTOMERS

BACKGROUND OF THE INVENTION

The present invention relates to novel isocyanate-terminated prepolymers having a viscosity of less than about 6000 mPa·s at 80° C. and an NCO content of about 3 to 10%. This invention also relates to a process for making these novel prepolymers, a process of producing polyurethane/polyurea elastomers from these novel prepolymers, and the elastomers produced therefrom.

Polyurethane casting compositions are described in U.S. Pat. No. 3,211,701. These comprise the reaction product of an isocyanate-terminated interpolymer with an organic crosslinking agent (which may be a polyamine or a polyhydric alcohol). The isocyanate-terminated interpolymer is prepared from a hydroxyl-terminated polyester urethane formed by reacting a polyester having a molecular weight of 900 to 1200 with an organic diisocyanate, with an excess of organic diisocyanate.

Isocyanate-terminated prepolymers are broadly described in U.S. Pat. No. 3,963,681. These prepolymers may be cured with an aromatic or aliphatic polyamine or polyol. Suitable isocyanates for the prepolymers include aromatic or aliphatic diisocyanates and triisocyanates. The polyurethane/urea elastomers of the '681 patent are based on mixtures of Polymegs of two different molecular weights (one high and one low, with ca. 1,000 to 4,500 average MW of the blend). These blends of polyols are described as resulting in better high temperature and dynamic properties than a single Polymeg having the same average MW as the above blend.

Prepolymers and polyurethane/ureas produced therefrom are described in U.S. Pat. Nos. 3,766,148 and 3,600,358. The prepolymers in both patents are based on methylene bis(4-phenylisocyanate). The '148 patent describes chain extending these methylene bis(4-phenylisocyanate) based prepolymers with MDA (4,4'-methylenedianiline) to form polyurethane/ureas. U.S. Pat. No. 3,600,358 describes prepolymers based on methylene bis(4-phenylisocyanate) with neopentyl adipate (or other esters of neopentyl glycol). These prepolymers are subsequently chain extended with aromatic diamines, preferably MDA, to form polyurethane/urea elastomers.

U.S. Pat. No. 3,115,481 also describes polyurethane/urea elastomers. These elastomers are formed by first preparing foams and subsequently crushing the cells in a heated press. This invention uses prepolymers wherein an aromatic isocyanate is present on the prepolymer ends. This increases the reactivity of the isocyanate prepolymers such that they are suitable for reaction with water to form foams. However, this high reactivity makes this type of prepolymer too fast to process with diamine chain extenders to form cast elastomers.

Polyurethane/urea elastomers are also described in U.S. Pat. No. 3,789,032. These elastomers are based on aliphatic isocyanate terminated prepolymers. The elastomers produced in this reference are also produced by reacting the aromatic isocyanate terminated prepolymers with water. Increased reactivity is also a problem in these prepolymers.

U.S. Pat. No. 4,098,773 describes prepolymers that are prepared from linear polyols and aliphatic isocyanates, cycloaliphatic isocyanates, aliphatic-aromatic isocyanates, sterically hindered aromatic isocyanates or 4,4'-methylene bis(phenylisocyanate) where the OH:NCO ratio is 1:1.1 to 1:2. They subsequently add a symmetrical aromatic diisocyanate to the prepolymer and chain extend with symmetric diols to prepare polyurethanes with high softening points.

U.S. Pat. No. 3,997,514 describes isocyanate terminated prepolymers prepared from mixtures of aromatic and aliphatic diisocyanates. These prepolymers comprise the reaction product of excess polyesters or polyether polyols with an aromatic diisocyanate to form a hydroxyl terminated prepolymer. This OH terminated prepolymer subsequently reacts with an excess of aliphatic diisocyanate to form a diisocyanate terminated prepolymer.

These prepolymers of U.S. Pat. No. 3,997,514 can be prepared in either a one-step or two-step process. In the two-step process, the aromatic diisocyanate must be mixed with a stoichiometric excess of glycol. More specifically, the glycol to aromatic diisocyanate mole ratio must be about 2:1. The intermediate OH terminated prepolymer is allowed to react with the excess aliphatic diisocyanate in a second reaction step. In the one-step process, all of the components are combined in a single reaction step. The intermediate OH terminated polyurethane prepolymer from the aromatic isocyanate and the polyol is generated in situ, and reacts further with the aliphatic diisocyanate to form an aliphatic isocyanate terminated polyurethane prepolymer. Polyurethane/polyurea elastomers can be produced by curing these prepolymers with aromatic diamines.

The prepolymers of the '514 patent have the disadvantage that many of them have high viscosities and therefore must be processed at high temperature (>100° C.) to allow molds to be filled with the viscous mixtures of prepolymers and chain extenders. This is problematic for processing as it requires that the prepolymers be stored at temperatures of 100° C. or higher. High temperature storage limits the storage lifetime of the prepolymers and results in increased energy costs for the manufacturer.

Most of the examples of the '514 patent use toluene diisocyanate as the aromatic isocyanate. This particular isocyanate (TDI) has a high vapor pressure and thus is less desirable from an industrial hygiene viewpoint.

In addition, MDA is used as a chain extender in preparing the elastomers described by the '514 reference. At the time of the invention, MDA was considered less hazardous than MOCA, which was already recognized as a carcinogen. Since that time, MDA has also been identified as a suspect human carcinogen. The potential for exposure to the MDA is considerable due to the high temperatures used when MDA is used as a chain extender for these polyurethane prepolymers. Simply replacing the MDA with a mixture of isomers of diethyltoluene diamine in the production of elastomers in the '514 reference is not possible. This substitution results in the mixture reacting too quickly to allow casting in open molds.

The '514 patent addressed the viscosity problem of the prepolymers by addition of a plasticizer which reduced the viscosity (See Example 10 of the '514 patent). Plasticizers, however, have the disadvantage that they slowly migrate from the finished molded article during its use. This phenomenon is well known and can occur by volatilization of the low molecular weight plasticizer or movement of it to the surface of the part. As the plasticizer is removed, the properties (hardness, flexibility, etc.) of the polymer change.

In addition, the plasticizer itself can be problematic. For example, plasticizers are known to be responsible for fogging in automobile windshields. Furthermore, potential exposure of people to the plasticizer can lead to additional hygiene concerns depending on the polymers end use application.

It has been surprisingly found that one can make a relatively low viscosity isocyanate-terminated prepolymer in one-step by reacting a polyether polyol with a mixture of aliphatic diisocyanate and aromatic diisocyanate in which the polyether polyol to aromatic diisocyanate mole ratio is significantly lower than 2:1. It has also been surprisingly found that such prepolymers can be mixed with aromatic diamine extenders at 80° C. and cast into a mold with sufficient pot life to be practical for production. These prepolymers react similarly with aromatic diamines as do prepolymers prepared from only aliphatic diisocyanates.

SUMMARY OF THE INVENTION

It is an object of the presently claimed invention to prepare isocyanate terminated prepolymers from aliphatic/ aromatic diisocyanate mixtures and which exhibit lower viscosities than the prepolymers of the prior art. These prepolymers are preferably obtained from raw materials which pose fewer problems from an industrial hygiene viewpoint and are easier to handle. Since these prepolymers contain higher ratios of aromatic diisocyanate to aliphatic diisocyanate than the prepolymers of the prior art, and therefore are more economical to produce.

Another object of the presently claimed invention is to provide a process for the production of these isocyanate-terminated prepolymers.

It is also an object of the presently claimed invention to produce polyurethane/polyurea cast elastomers with good mechanical properties and high softening points that overcome the disadvantages associated with prior art elastomers. These elastomers should be readily processable at temperatures of 80° C., without requiring the addition of plasticizers to reduce the prepolymers' viscosity. It is a further object of the invention that these polyurethane/polyureas have sufficient green strength to allow demolding within 30 minutes of casting without requiring added catalysts during the chain extension step. It is also an object of this invention that no suspect carcinogens are required to chain extend these cast elastomers. Surprisingly, all of these goals can be achieved using commercially available raw materials well known in the polyurethane industry.

DESCRIPTION OF THE INVENTION

This invention relates to novel isocyanate-terminated prepolymers having a viscosity of less than about 6000 mPa•s, preferably less than about 3500 mPa•s at 80° C. and an NCO content of about 3 to 10%. These prepolymers comprise the reaction product of a) an aromatic diisocyanate, b) a polyether polyol having an OH number of about 25 to 125 and containing from about 1.8 to 2.5, preferably 1.9 to 2.2 hydroxyl groups, and c) an aliphatic diisocyanate, wherein the equivalents ratio of the polyether polyol to aromatic diisocyanate is from about 1.0:0.7 to 1.0:1.1 and the total ratio of equivalents of isocyanate to polyol in the prepolymer is from about 2:1 to 4:1.

It is preferred that the equivalents ratio of aliphatic diisocyanate to aromatic diisocyanate be at least 1:1. It is also preferred that these prepolymers are aliphatic isocyanate-terminated prepolymers.

As used herein, the phrase "total ratio of equivalents of isocyanate to polyol" refers to the sum of the equivalents of NCO groups present in the aromatic diisocyanate plus the equivalents of NCO groups present in the aliphatic diisocyanate, divided by the equivalents of hydroxyl groups present in the polyether polyol.

As used herein, the term "aliphatic diisocyanate" refers to any aliphatic diisocyanate, araliphatic diisocyanate, or cycloaliphatic diisocyanate.

These prepolymers are prepared by adding the polyether polyol to a mixture comprising the aromatic diisocyanate and the aliphatic diisocyanate in the presence of heat to form a reaction mixture, and allowing the reaction mixture to fully react to yield the prepolymer. A catalyst may be added with the polyether polyol or the mixture of isocyanates.

The polyurethane/polyurea elastomers are prepared by combining the prepolymers described above with the diamine at an NCO:NH of about 0.9 to 1.2.

The present invention also relates to a process for making these novel prepolymers, a process of producing polyurethane/polyurea elastomers from these novel prepolymers, and the elastomers produced therefrom.

In a preferred embodiment, these isocyanate-terminated prepolymers have a viscosity of less than 3500 mPa•s at 80° C., and an NCO content of about 4 to 7%, wherein the equivalent ratio of the polyether polyol to the aromatic diisocyanate is preferably from about 1.0 to 0.8 to 1.0 to 1.0. It is also preferred that the polyether polyol have an OH number of about 56 to 112 and contain about 2 hydroxyl groups. Polypropylene oxide polyether polyols are particularly preferred polyethers according to the invention. A preferred aromatic diisocyanate is 4,4'-diisocyanatodiphenylmethane, and a preferred aliphatic diisocyanate is diisocyanatodicyclohexylmethane.

A most preferred aliphatic diisocyanate is an isomeric mixture of diisocyanatodicyclohexylmethane containing at least 50% by weight of the trans,trans-isomer.

In a particularly preferred embodiment, it is preferred that the aromatic diisocyanate used to prepare the prepolymers of the invention, when present in monomer form, does not exhibit high vapor pressure or volatility. Nor should the aromatic diisocyanate readily sublime at atmospheric pressure. Some examples of aromatic diisocyanate monomers which have high vapor pressures include toluene diisocyanate, para-phenylene diisocyanate, and naphthylene diisocyanate. These aromatic diisocyanates are preferably not used in the present invention.

Substantially any aromatic diisocyanate is suitable for component a) of the prepolymers according to the invention. Such diisocyanates include aromatic diisocyanates of the type described, for example, by W. Siefken in Justus Liebigs Annalen der Chemie, 562, pages 75 to 136, for example those corresponding to the following formula:

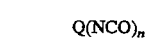

in which n=2, and Q is an aromatic hydrocarbon radical containing 6 to 15 (and preferably 6 to 13) carbon atoms. In general, the commercially available diisocyanates are used. These include, for example, 2,4- and 2,6-tolylene diisocyanate and mixtures of these isomers ("TDI"); diphenylmethylene diisocyanates obtained by isolating them from mixtures ("crude MDI") obtained upon phosgenation of aniline-formaldehyde condensates ("crude MDA"); naphthalene-1,5-diisocyanate and mixtures thereof with various isomers; metaxylene diisocyanate; m- or p-phenylene diisocyanate; diisocyanates containing carbodiimide groups, urethane groups, allophanate groups, isocyanurate groups, urea groups or biuret groups ("modified diisocyanates"), more specifically, modified diisocyanates derived from 2,4- and/or 2,6-tolylene diisocyanate and from 4,4'- and/or 2,4'-diphenylmethane diisocyanate. A particularly preferred aromatic diisocyanate is 4,4'-diphenylmethane diisocyanate.

Suitable polyether polyols to be used as component b) in the prepolymers according to the invention include, for example, those polyether polyols having an OH number of about 25 to 125 and containing from about 1.8 to 2.5, preferably 1.9 to 2.2 hydroxyl groups. These polyethers are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water, alcohols or amines. Examples of suitable alcohols and amines include the low molecular weight chain extenders set forth hereinafter, propylene glycol, glycerin, ethylene glycol, triethanolamine, water, trimethylolpropane, bisphenol A, aniline, ammonia, ethanolamine and ethylene diamine.

The preferred polyether polyols include polymers of propylene oxide and/or copolymers of ethylene and propylene oxide wherein the oxides contain about 15% by weight or more propylene oxides.

Substantially any aliphatic diisocyanate is suitable for component c) of the prepolymers according to the invention. Such diisocyanates include aliphatic diisocyanates of the type described, for example, by W. Siefken in Justus Liebigs Annalen der Chemie, 562, pages 75 to 136, for example those corresponding to the following formula:

$$Q(NCO)_n$$

in which n=2, and Q is an aliphatic hydrocarbon radical containing 2 to 18, preferably 6 carbon atoms, and/or a cycloaliphatic hydrocarbon radical containing 4 to 15, preferably 5 to 13 carbon atoms. These organic aliphatic diisocyanates and cycloaliphatic diisocyanates include, for example, 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanato-methyl-3,5,5-trimethylcyclohexane (isophorone diisocyanate or IPDI), bis-(4-isocyanatocyclohexyl)-methane, 2,4'-dicyclohexylmethane diisocyanate, 1,3- and 1,4-bis-(isocyanatomethyl)-cyclohexane, bis-(4-isocyanato-3-methylcyclohexyl)-methane, α',α',α',α'-tetramethyl-1,3-and/or -1,4-xylylene diisocyanate, 1-isocyanato-1-methyl-4 (3)-isocyanatomethyl cyclohexane, 2,4- and/or 2,6-hexahydrotoluylene diisocyanate, and mixtures thereof. It is preferred that the diisocyanate is bis-(4-isocyanatocyclohexyl)-methane.

These aliphatic isocyanate-terminated prepolymers are prepared by mixing the aliphatic and aromatic diisocyanates at 40° to 80° C. and stirring the mixture under a nitrogen atmosphere. Then, the polyol component is added to this mixture, followed by heating to about 60° to 100° C., and allowed to react at this temperature for one hour. Finally, the urethane catalyst can be added and the reaction is allowed to proceed at 60° to 100° C. until the isocyanate content (as determined by n-butyl amine titration) reaches the theoretical value (or slightly lower).

Although it is known in the prior art to prepare prepolymers from mixtures of aromatic and aliphatic diisocyanates by either a one-step or a two-step process, the one-step process is preferred for the prepolymers of the present invention. For the prepolymers of the present invention, the equivalents ratio of polyol to aromatic diisocyanate is in many cases near or at 1.0:1.0. When these prepolymers are prepared in a two-step reaction, the intermediate product formed by the reaction of the polyol and the aromatic diisocyanate increases in viscosity as the equivalents ratio of polyol to aromatic diisocyanate approaches 1.0:1.0 due to its high molecular weight. This makes it difficult to combine the intermediate product with the second diisocyanate, which would be added in a subsequent reaction step. Therefore, the two-step process is less preferred.

As the equivalents ratio of polyol to aromatic diisocyanate drops from about 1.0:1.0 to 1.0:0.8 or 1.0:0.7, the viscosity of the intermediate product decreases. Thus, at certain ratios of polyol to aromatic diisocyanate, it is possible to prepare the present prepolymers by the two-step process.

Catalysts may be present in the process of preparing the prepolymers. When catalysts are used, it is preferred that they are added after the reaction of the aromatic diisocyanate is substantially complete. Suitable catalysts to be used in the present invention include, for example, organometallic catalysts.

Some examples of suitable organometallic catalysts include, for example organometallic compounds of tin, lead, iron, bismuth, mercury, etc. Preferred organotin catalysts include compounds such as, for example, tin acetate, tin octoate, tin ethylhexanoate, tin oleate, tin laurate, dimethyltin dilaurate, dibutyltin oxide, dibutyltin dichloride, dimethyltin dichloride, dibutyltin diacetate, diethyltin diacetate, dimethyltin diacetate, dibutyltin dilaurate, diethyltin dilaurate, dimethyltin dilaurate, dibutyltin maleate, dimethyltin maleate, dioctyltin diacetate, dioctyltin dilaurate, di(2-ethylhexyl)tin oxide, etc. Delayed action or heat-activated tin catalysts such as, for example, dibutyltin dimercaptide, dibutyltin diisooctylmercaptoacetate, dimethyltin dimercaptide, dibutyltin dilaurylmercaptide, dimethyltin dilaurylmercaptide, dimethyltin diisooctylmercaptoacetate, di(n-butyl)tin bis(isooctylmercaptoacetate), and di(isooctyl) tin bis(isooctyl-mercaptoacetate), all of which are commercially available from Witco Chemical Corp., may also be used. The use of a delayed action catalyst such as an iron pentanedione, nickel acetylacetonate or a bismuth carboxylate, as described in U.S. Pat. No. 4,611,044, herein incorporated by reference, is also possible.

Organometallic catalysts are usually used in amounts ranging from about 25 to 1000 ppm, preferably about 25 to 100 parts per million parts of prepolymer. It is most preferred that the catalysts be used in quantities such that they comprise less than 100 ppm preferably less than 50 ppm of prepolymer.

Polyurethane/polyurea elastomers can be prepared by curing the aliphatic isocyanate-terminated prepolymers described above with an aromatic amine or a sterically hindered aromatic amine as a curing agent. The prepolymer (prepared as described above) is heated under vacuum to remove entrapped gases. The diamine chain extender is combined with the prepolymer and mixed. Sufficient quantities of the diamine are added such that the ratio of equivalents of isocyanate in the prepolymer to equivalents of amine in the chain extender lies between 0.9 and 1.2, preferably about 1.05. The mixture of prepolymer and chain extender is transferred into a pre-heated mold. The mold is placed in a vented air circulating oven until the part is cured. The part is then removed from the mold and post-cured overnight.

Suitable curing agents for the isocyanate-terminated prepolymers of the present invention include, for example, sterically hindered aromatic polyamines, sterically hindered aromatic diamines, diamines substituted with electron withdrawing groups, and mixtures thereof.

These sterically hindered aromatic diamines have molecular weights of less than 500 and include, for example, 1-methyl-3,5-diethyl-2,4-diamino benzene, 1-methyl-3,5-diethyl-2,6-diamino benzene, 3,5-dimethylthio-2,4-toluene diamine, 3,5-dimethylthio-2,6-toluene diamine, 1,3,5-trimethyl-2,4-diamino benzene, 1,3,5-triethyl-2,4-diamino benzene, 3,5,3',5'-tetraethyl-4,4'-diamino diphenylmethane, 3,5,3',5'-tetraisopropyl-4,4'-diamino diphenylmethane, 3,5-diethyl-3',5'-diisopropyl-4,4'-diamino diphenylmethane, 3,5-diethyl-5,5'-diisopropyl-4,4'-diamino diphenylmethane, 1-methyl-2,6-diamino-3-isopropyl-benzene, trimethylene glycol di-p-amino-benzoate, and mixtures of the above diamines, such as, for example, mixtures of 1-methyl-3,5-diethyl-2,4-diamino benzene and 1-methyl-3,5-diethyl-2,6-diamino benzene in a weight ratio between about 50:50 to 85:15, preferably about 65:35 to 80:20.

The difunctional and polyfunctional aromatic amine compounds may also exclusively or partly contain secondary amino groups such as 4,4'-di-(methylamino)-diphenylmethane, or 1-methyl-2-methylamino-4-amino-benzene.

The sterically hindered diamines are known and are described in, for example, U.S. Pat. Nos. 4,146,688, 4,595,742, 4,631,298 and 5,059,634, the disclosures of which are herein incorporated by reference. In general, these hindered diamines correspond to one of the following formulas:

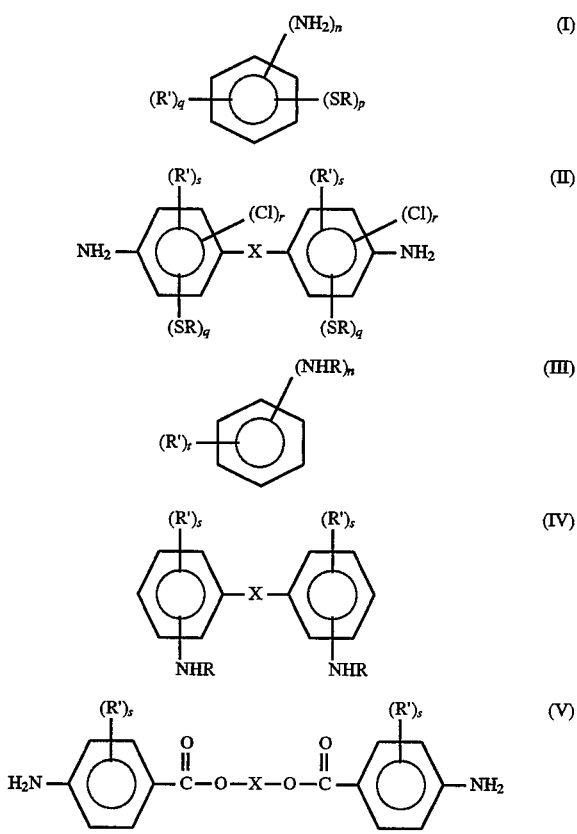

wherein
each R may be the same or different and represents an alkyl group, preferably of from 1 to 20 carbon atoms and most preferably from 1 to 6 carbon atoms,
each R' may be the same or different and represents H or any substituent which does not adversely affect polyurethane formation, more preferably an alkyl group of from 1 to 6 carbon atoms or H,
n=2 or 3, preferably 2,
p=2 or 3, preferably 2,
q=0 to 2,
r=0 to 2, preferably 1,
s=0 to 4, preferably 0 to 2,
t=3 or 4,
and
X is an alkylene or alkylidene.

The presently preferred sterically hindered amines are commercially available and sold as Baytec CUR W (a mixture of 3,5-diethyl-2,4-toluenediamine and 3,5-diethyl-2,6-toluenediamine; Bayer Corp.) and Ethacure 300 from Ethyl Corporation (a mixture of 3,5-dimethylthio-2,4-toluenediamine and 3,5-diethyl-thio-2,6-toluenediamine). Other specific sterically hindered diamines are described in the patents noted above.

Various additives can be included in the elastomers of this invention. Such additives may include, but are not limited to light and heat stabilizers and various antioxidants, pigments, flame retardants and fillers.

The polyurethane/polyureas of this invention can be used as elastomers for various roller and wheel applications, belts for material transport and processing, chopping blankets, binders and encapsulants and optically clear laminates.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following materials were used in the examples:

r-MDI: an isomeric mixture of dicyclohexylmethane-4,4'-diisocyanate

MDI: 4,4'-diisocyantodiphenylmethane

Polyol A: a propylene glycol started propylene oxide polyether having a functionality of two (2) and an OH number of about 56

Polyol B: a propylene glycol started propylene oxide polyether having a functionality of about two (2) and an OH number of about 112

Polyol C: a polytetramethylene glycol with a functionality of about 2 and an OH number of about 112

DETDA: a mixture consisting mainly of isomers of 3,5-diethyl-2,4-toluenediamine and 3,5-diethyl-2,6-toluenediamine ETHA300: a mixture of 3,5-dimethylthio-2,4-toluenediamine and 3,5-dimethylthio-2,6-toluenediamine; commercially available as ETHACURE-300 from Ethyl Corporation Catalyst A: dibutyl tin dilaurate catalyst; commercially available from Air Products as Dabco T-12; used as a 1% solution in Polyol A Example 1A (According to the Invention)
(Prepolymer Preparation—General Procedure)

A mixture of isomers of r-MDI (514.0 g.; 3.92 eq.) was weighed into a clean, dry, 5-liter, 3-necked flask equipped with an overhead stirring unit, a thermocouple and a vacuum take-off/nitrogen inlet. The r-MDI was heated to 50° C. under nitrogen. Molten MDI (386.97 g.; 3.10 eq.) was added to the r-MDI. The resulting mixture was stirred for approximately 10 minutes under nitrogen. Polyol A (3079 g.; 3.08 eq.) was added to the isocyanate blend. The mixture was heated to 80° C. and the reaction allowed to proceed under nitrogen for one hour before adding 50 ppm of Catalyst A. Following addition of the catalyst, the temperature of the reaction mixture began to rise rapidly and the heating mantle was removed. Once the temperature leveled off, the system was evacuated to less than 2 mm Hg and the mixture was brought to 80° C. After 3 hours at 80° C., a sample of the prepolymer (hereafter referred to as Prepolymer A) was withdrawn and titrated for NCO content using a standard n-butyl amine titration. NCO content of Prepolymer 1A: experimental=4.01% (theoretical=4.11%).

Prepolymers 1B through 1H were prepared by an analogous procedure; formulations can be found in Table 1a and physical properties of the prepolymers can be found in Table 1b.

Example 2A (According to the Invention)

(Elastomer Preparation—General Procedure)

Prepolymer 1A from Example 1A (200 g.; 0.191 eq) was degassed and carefully poured (so as not to introduce air bubbles) into a preheated (~80° C.) 8 oz. glass jar. A chain extender, DETDA (16.19 g.; 0.182 eq.), was added to the prepolymer. The mixture was stirred at high speed for 30 seconds. While stirring, the paddle of the mechanical stirrer was held below the surface of the liquid in order to minimize air incorporation into the sample. After stirring was completed, the mixture was poured into a preheated mold. The mold was preheated to about 110° C. and was treated with mold release prior to the mixture being poured. The part was cured in a vented oven at 110° C. for 30 minutes, then demolded and post-cured at 110° C. overnight (~16 hours). This part is referred to hereafter as Elastomer 2A. After aging for a minimum of two weeks, the physical properties of Elastomer 2A were determined.

Elastomers 2B through 2I were prepared by an analogous procedure. Formulations can be found in Table 2a, and physical properties of these elastomers are given in Table 2b.

Example 3A (Comparative Example)

(Prepolymer Preparation—General Procedure)

A mixture of isomers of r-MDI (235.8 g.; 1.80 eq.) was weighed into a clean, dry, 5-liter, 3-neck flask equipped with an overhead stirring unit, a thermocouple and a vacuum take-off/nitrogen inlet. Polyol A (789.4 g.; 0.79 eq.) was added to the isocyanate. Then, 50 ppm of Catalyst A was added to the isocyanate/polyol mixture. The mixture was heated to 80° C. and evacuated to less than 2 mm Hg. After 3 hours at 80° C. a sample of the prepolymer (hereafter referred to as Prepolymer 3a) was withdrawn and titrated for NCO content using a standard n-butyl amine titration. NCO content of Prepolymer 3A: experimental=3.96% (theoretical=4.09%).

Prepolymers 3B through 3D were prepared by an analogous procedure; formulations can be found in Table 3.

Example 4A: (Elastomer Preparation—General Procedure)

Prepolymer 3A (200 g.; 0.189 eq.) was degassed and carefully poured (so as not to introduce air bubbles) into a preheated (~80° C.) 8 oz. glass jar. Chain extender A (16.0 g.; 0.180 eq.) was added to the preheated prepolymer. The mixture was stirred at high speed for 30 seconds. While stirring, the paddle of the mechanical stirrer was held below the surface of the liquid in order to minimize air incorporation into the sample. After stirring was completed, the mixture was poured into a preheated mold (previously heated to about 110° C. and treated with an external mold release agent). The part was cured in a vented oven at 110° C. for 30 minutes, then demolded and post-cured at 110° C. overnight (~16 hours). This part is referred to hereafter as Elastomer 4A. After aging for a minimum of two weeks, the physical properties of Elastomer 4A was determined.

Elastomers 4B through 4D were prepared by an analogous procedure. Formulations and physical properties for these polyurethane/polyureas can be found in Tables 4a and 4b respectively.

Example 5A: Prepolymer Preparation (Comparative Example)

A prepolymer was prepared by heating 333.3 g (0.667 eq.) of polyol C to 80° C. and combining this polyol with 2,4-toluenediisocyanate (23.2 g; 0.267 eq.). The mixture was allowed to stir at 80° C. for 30 minutes. Then r-MDI (139.95 g; 1.07 eq.) was added to the flask and the mixture allowed to stir at 120° C. for two hours. The resulting prepolymer (hereafter referred to as Prepolymer 5A) had an isocyanate content of 5.47% (theory 5.64%) and a viscosity of 2800 mPa·s at 100° C.

Prepolymer 5B was prepared by an analogous procedure. Formulations for these prepolymers can be found in Table 5.

Example 6A: Cast Elastomer Preparation (Comparative Example)

Prepolymer 5A (100 g; 0.130 eq. NCO) was degassed at 100° C. and combined with 11.03 g (0.124 eq.) of DETDA (at 25° C.) The mixture was stirred rapidly, but gelled before the sample could be poured into a plaque mold.

Elastomer 6B was prepared by an analagous procedure. The cast times of these prepolymers with DETDA are given in Table 6 These comparative elastomers were all too reactive to prepare molded articles in open molds.

Example 7: Prepolymer Preparation (Comparative Example)

A mixture of isomers of r-MDI (17.33 g; 0.132 eq.) was weighed into a clean, dry, 250 ml, 3-necked flask equipped with an overhead stirring unit, a thermocouple and a vacuum take-off/nitrogen inlet. The r-MDI was heated to 50° C. under nitrogen. Molten MDI (11.80 g; 0.094 eq.) was added to the r-MDI. The resulting mixture was stirred for approximately 10 minutes under nitrogen. Polyol A (70.37 g; 0.0704 eq.) was added to the isocyanate blend. The mixture was heated to 80° C. and the reaction allowed to proceed under nitrogen for one hour before adding 50 ppm Catalyst A. The flask was evacuated to less than 2 mm Hg and the mixture stirred at 80° C. for 3 hours. The NCO content of the prepolymer was 6.50%.

Example 8: Elastomer Preparation (Comparative Example)

The prepolymer prepared in Example 7 (70 g; 0.108 eq.) was degassed and carefully poured into a preheated (~80° C.) 8 oz. glass jar. DETDA (9.18 g; 0.103 eq.) was added to the prepolymer. The mixture was stirred at high speed for 30 seconds. After stirring was completed, we attempted to pour the mixture into a pre-heated mold, but the mixture gelled before the mold could be filled.

TABLE 1a

Prepolymers Prepared According to the Invention

| Prepolymer | grams r-MDI (eq.) | grams MDI (eq.) | Polyol | grams Polyol (eq.) |
|---|---|---|---|---|
| 1A | 514.0 (3.92) | 387.0 (3.10) | Polyol A | 3079 (3.08) |
| 1B | 854.5 (6.51) | 349.2 (2.79) | Polyol A | 2776.4 (2.78) |
| 1C | 500.1 (3.81) | 317.9 (2.54) | Polyol A | 3162.0 (3.16) |
| 1D | 727.4 (5.54) | 297.2 (2.38) | Polyol A | 2955.4 (2.96) |
| 1E | 170.6 (1.30) | 137.5 (1.10) | Polyol A | 1000.0 (1.00) |
| 1F | 170.6 (1.30) | 137.5 (1.10) | Polyol B | 500.0 (1.00) |
| 1G | 275.5 (2.10) | 137.5 (1.10) | Polyol C | 500.0 (1.00) |
| 1H | 419.8 (3.20) | 137.5 (1.10) | Polyol A | 1000.0 (1.00) |

TABLE 1b

Physical Properties of Prepolymers from Table 1a

| Prepolymer | % NCO expt. | Viscosity (mPa·s at 80° C.) | Equivalents of rMDI:MDI:polyol |
|---|---|---|---|
| 1A | 4.01 | 1700 | 1.27:1.0:1.0 |
| 1B | 6.77 | 750 | 2.33:1.0:1.0 |
| 1C | 3.27 | 3200 | 1.2:0.8:1.0 |
| 1D | 5.13 | 1707 | 1.87:0.8:1.0 |
| 1E | 4.50 | 1050 | 1.3.1.1:1.0 |
| 1F | 6.90 | 1760 | 1.3:1.1:1.0 |
| 1G | 9.67 | 5600 | 2.1:1.1:1.0 |
| 1H | 8.70 | 525 | 3.2:1.1:1.0 |

TABLE 2a

Polyurethane/Polyurea Elastomers Prepared According to the Invention

| Elastomer | Prepolymer | Grams of Prepol. (eq.) | Chain Extender | Grams of Extnd. (eq.) | NCO:NH ratio |
|---|---|---|---|---|---|
| 2A | 1A | 200.0 (0.191) | DETDA | 16.2 (0.182) | 1.05 |
| 2B | 1B | 180.0 (0.290) | DETDA | 24.6 (0.276) | 1.05 |
| 2C | 1C | 180.0 (0.140) | DETDA | 11.9 (0.134) | 1.05 |
| 2D | 1D | 180.0 (0.220) | DETDA | 18.6 (0.209) | 1.05 |
| 2E | 1E | 142.7 (0.170) | ETHA300 | 17.3 (0.161) | 1.05 |
| 2F | 1F | 137.0 (0.225) | ETHA300 | 23.0 (0.215) | 1.05 |
| 2G | 1G | 162.0 (0.373) | ETHA300 | 38.0 (0.355) | 1.05 |
| 2H | 1H | 165.1 (0.342) | ETHA300 | 34.9 (0.326) | 1.05 |
| 2I | 1H | 170.1 (0.352) | DETDA | 29.9 (0.336) | 1.05 |

TABLE 2b

Physical Properties of the Elastomers from Table 2a

| Elast. | 2A | 2B | 2C | 2D | 2E | 2F | 2G | 2H | 2I |
|---|---|---|---|---|---|---|---|---|---|
| Pot Life (min.) | 3.10 | 1.70 | 4.10 | 2.90 | 4.50 | 3.75 | 4.00 | 6.50 | 2.10 |
| Shore A | 82 | 95 | 67 | 88 | — | — | — | — | — |
| Shore D | 28 | 44 | 18 | 30 | 22 | 50 | 63 | 52 | 58 |
| Rebound (%) | 47 | 45 | 48 | 47 | 39 | 35 | 46 | 51 | 50 |
| Comp. Set (%) | 54 | 82 | 66 | 71 | 83 | 70 | 83 | 80 | 88 |
| 100% Modulus (psi) | 571 | 1206 | 337 | 747 | 442 | 1660 | 3134 | 1769 | 1975 |
| 300% Modulus (psi) | 1066 | 2010 | 618 | 1291 | 586 | — | — | 2776 | 3034 |
| Elong (%) | 614 | 519 | 527 | 617 | 426 | 269 | 236 | 301 | 299 |
| Tensile (psi) | 2703 | 3257 | 950 | 2810 | 584 | 3247 | 4799 | 2791 | 3048 |
| Die C (pli) | 324 | 446 | 136 | 393 | 155 | 368 | 619 | 496 | 564 |
| Soft. Pt. (°C.) | — | — | — | — | 145 | — | 185 | 182 | 218 |

TABLE 3

Comparative Prepolymers and Properties of these Prepolymers (produced according to Example 3)

| Prepolymer | grams of rMDI (eq.) | Polyol | grams of Polyol (eq.) | % NCO expt. (theor) | Viscs. (mPa · s at 80° C.) |
|---|---|---|---|---|---|
| 3A | 235.8 (1.80) | Polyol A | 789.4 (0.790) | 3.96 (4.09) | 595 |
| 3B | 303.8 (2.32) | Polyol A | 691.2 (0.691) | 6.63 (6.81) | 260 |
| 3C | 207.5 (1.58) | Polyol A | 787.5 (0.788) | 3.18 (3.32) | 850 |
| 3D | 260.1 (1.98) | Polyol A | 739.8 (0.740) | 5.03 (5.18) | 400 |

TABLE 4a

Polyurethane/Polyurea Elastomers Prepared Using Comparative Prepolymers from Table 3

| Elastomer | Prepolymer | Grams of Prepol. (eq) | Chain Extender | Grams of Extdr. (eq) | Isocyanate Index |
|---|---|---|---|---|---|
| 4A | 3A | 200.0 (0.189) | DETDA | 16.0 (0.180) | 1.05 |
| 4B | 3B | 200.0 (0.316) | DETDA | 26.8 (0.292) | 1.05 |
| 4C | 3C | 200.0 (0.151) | DETDA | 12.8 (0.144) | 1.05 |
| 4D | 3D | 190.0 (0.228) | DETDA | 19.3 (0.217) | 1.05 |

TABLE 4b

Physical Properties of the Polyurethane/Polyurea Elastomers in Table 4a

| Elastomer | 4A | 4B | 4C | 4D |
|---|---|---|---|---|
| Pot Life (min.) | 3.0 | 3.0 | 4.0 | 3.0 |
| Shore A | 80 | 95 | 70 | 89 |
| Shore D | 27 | 45 | 20 | 35 |
| Rebound (%) | 50 | 50 | 49 | 49 |
| Comp. Set (%) | 57 | 75 | 55 | 72 |
| 100% Modulus (psi) | 545 | 1246 | 388 | 781 |
| 300% Modulus (psi) | 1020 | 2266 | 744 | 1415 |
| Elong (%) | 627 | 508 | 636 | 623 |
| Tensile (psi) | 2635 | 3792 | 1741 | 3388 |
| Die C (pli) | 357 | 470 | 311 | 417 |

TABLE 5

Comparative Prepolymers Prepared According to Comparative Example 5

| Prepolymer | grams r-MDI (eq) | grams TDI (eq) | Polyol | grams Polyol (eq) |
|---|---|---|---|---|
| 5A | 139.95 (1.07) | 23.2 (0.267) | Polyol C | 333.3 (0.667) |
| 5B | 122.45 (0.934) | 34.8 (0.40) | Polyol C | 333.3 (0.667) |

TABLE 6

Properties of Comparative Prepolymers from Example 6 and Cast Times with DETDA

| Prepolymer | % NCO expt. | Viscosity (mPa·s at 100° C. | Equivalents r-MDI:TDI: Polyol | Pot Life with DETDA (min.) |
|---|---|---|---|---|
| 5A | 5.47 | 2800 | 1.6:0.4:1.0 | 1.0 |
| 5B | 5.40 | 7200 | 1.4:0.6:1.0 | 1.0 |

The following ASTM methods were used to determine the properties in the examples:

Shore Hardness: D-2240-85
Resilience: D-430-73
Compression Set: D-395-69 (method B)
Tensile/Modulus/Elongation: D-412-48
Die C Tear: D-624-91

Prepolymers and elastomers of the present invention are prepared in Examples 1 and 2, respectively. These examples illustrate that low viscosity prepolymers can be prepared according to the invention. These prepolymers are combined with sterically hindered non-carcinogenic aromatic diamines to produce polyurethane/polyurea elastomers. These systems have viscosities low enough to allow processing without plasticizers at 80° C. and have pot lives sufficient to allow one to fill open molds. The elastomers have good mechanical properties and softening points on the order of 150° C. or higher.

Comparative Examples 3 and 4 illustrate the pot-lives and mechanical properties of the elastomers that are produced from a prepolymer based on only an aliphatic diisocyanate (r-MDI). This comparison shows that the prepolymers of our invention have very similar processing parameters and final physical properties to these systems based on r-MDI alone.

Comparative Examples 5 and 6 illustrate that one can not simply take the prepolymers prepared from the combinations of aromatic and aliphatic diisocyanates that are described in U.S. Pat. No. 3,997,514 and replace the MDA chain extender with DETDA. If one tries such a simple substitution, the pot life of the mixture is too short to allow the samples to be cast into open molds. The casting temperature of these prepolymers can not be reduced (which would increase the pot life) because the prepolymers become too viscous to process at temperatures below 100° C.

Comparative Example 7 illustrates that if one choses a ratio of aromatic diisocyanate: polyol of greater than 1.1:1.0, the reaction mixture reacts too quickly with the aromatic diamine to prepare cast articles.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An isocyanate-terminated prepolymer having a viscosity less than about 6000 mPa·s at 80° C. and an NCO content of about 3 to 10%, and comprising the reaction product of
   a) an aromatic diisocyanate,
   b) a polyether polyol having an OH number of about 25 to 125 and containing from about 1.8 to 2.5 hydroxyl groups, and
   c) an aliphatic diisocyanate, wherein the equivalents ratio of said polyether polyol to said aromatic diisocyanate is from about 1.0:0.7 to 1.0:1.1.

2. An isocyanate-terminated prepolymer having a viscosity less than about 6000 mPa·s at 80° C. and an NCO content of about 3 to 10%, and comprising the reaction product of
   a) 4,4'-diisocyanatodiphenylmethane,
   b) a polyether polyol having an OH number of about 25 to 125 and containing from about 1.9 to 2.2 hydroxyl groups, and
   c) an isomeric mixture of diisocyanato dicyclohexylmethane wherein the equivalents ratio of said polyether polyol to said 4,4'-diisocyanatodiphenylmethane is from about 1.0:0.7 to 1.0:1.1.

3. The isocyanate-terminated prepolymer of claim 2, wherein said isomeric mixture of diisocyanato dicyclohexylmethane contains at least 50% by weight of the trans,trans isomer.

4. The isocyanate-terminated prepolymer of claim 2 wherein said viscosity is less than about 3500 mPa·s at 80° C. and said NCO content is about 4 to 7%, and comprising the reaction product of
   a) 4,4'-diisocyanatodiphenylmethane,
   b) a polyether polyol having an OH number of about 56 to 112 and containing from about 2 hydroxyl groups, and
   c) an isomeric mixture of diisocyanato dicyclohexylmethane wherein the equivalent ratio of said polyether polyol to said 4,4'-diisocyanatodiphenylmethane is from about 1.0:0.8 to 1.0:1.0.

5. A process for the preparation of an isocyanate-terminated prepolymer having a viscosity of less than about 6000 mPa·s at 80° C. and an NCO content of about 3 to 10%, comprising
   1) adding
      b) a polyether polyol having an OH number of about 25 to 125 and containing from about 1.8 to 2.5 hydroxyl groups,
      to a mixture comprising
      a) an aromatic diisocyanate and
      c) an aliphatic diisocyanate,
      in the presence of heat to form a reaction mixture, wherein the equivalents ratio of said polyether polyol to said aromatic diisocyanate is from about 1.0:0.7 to 1.0:1.1; and
   2) allowing the reaction mixture to fully react, thereby yielding said prepolymer.

6. The process of claim 5, wherein said aromatic diisocyanate comprises 4,4'-diisocyanatodiphenylmethane, said polyether polyol contains about 1.9 to 2.2 hydroxyl groups, and said aliphatic diisocyanate comprises an isomeric mixture of diisocyanato dicyclohexylmethane.

7. The process of claim 6, wherein said isomeric mixture of diisocyanato dicyclohexylmethane comprises at least 50% by weight of the trans,trans-isomer.

8. The process of claim 5, wherein said polyether polyol has an OH number of about 56 to 112 and contains about 2 hydroxyl groups.

9. The process of claim 5, wherein said equivalents ratio of polyether polyol to aromatic diisocyanate is from about 1.0 to 0.8 to 1.0 to 1.0.

10. In a process for the preparation of a polyurethane/polyurea elastomer comprising mixing a diisocyanate with a sterically hindered aromatic amine group containing compound, allowing the mixture to fully react, the improvement wherein said diisocyanate is the isocyanate-terminated prepolymer of claim 1.

11. The process of claim 10, wherein said isocyanate-terminated prepolymer has a viscosity of less than about 3500 mPa•s at 80° C. and said NCO content is about 4 to 7%, and comprises the reaction product of a) 4,4'-diisocyanatodiphenylmethane, b) a polyether polyol having an OH number of about 56 to 112 and containing from about 2 hydroxyl groups, and c) an isomeric mixture of diisocyanato dicyclohexylmethane wherein the equivalent ratio of said polyether polyol to said 4,4'-diisocyanatodiphenylmethane is from about 1.0:0.8 to 1.0:1.0.

12. The polyurethane/polyurea elastomer produced by the process of claim 10.

13. The polyurethane/polyurea elastomer produced by the process of claim 11.

* * * * *